(12) United States Patent
Su (10) Patent No.: US 10,334,340 B2
(45) Date of Patent: Jun. 25, 2019

(54) MICROPHONE WITH INTEGRATED SOUND BOX

(71) Applicant: Shenzhen Hua Sirui Technology Co. Ltd, Shenzhen (CN)

(72) Inventor: Kuo Su, Shenzhen (CN)

( * ) Notice: Subject to any disclaimer, the term of this patent is extended or adjusted under 35 U.S.C. 154(b) by 0 days.

(21) Appl. No.: 16/001,341

(22) Filed: Jun. 6, 2018

(65) Prior Publication Data

US 2019/0069060 A1    Feb. 28, 2019

(30) Foreign Application Priority Data

Aug. 25, 2017    (CN) ..................... 2017 2 1086428 U (51) Int. Cl.
| | |
|---|---|
| *H04R 1/08* | (2006.01) |
| *H04M 1/27* | (2006.01) |
| *H04M 1/60* | (2006.01) |
| *H04R 1/20* | (2006.01) |

(52) U.S. Cl.
CPC .............. *H04R 1/08* (2013.01); *H04M 1/271* (2013.01); *H04M 1/6033* (2013.01); *H04R 1/20* (2013.01)

(58) Field of Classification Search
CPC .... G10H 1/361; G10H 2210/281; H04R 1/08; H04R 1/083; H04R 27/04; H04M 1/03

USPC .................................. 381/26, 355, 357, 111
See application file for complete search history.

(56) References Cited

U.S. PATENT DOCUMENTS

2017/0316767 A1* 11/2017 You ........................ G10H 1/361

* cited by examiner

*Primary Examiner* — Paul Kim
*Assistant Examiner* — Ubachukwu A Odunukwe
(74) *Attorney, Agent, or Firm* — Novoclaims Patent Services LLC; Mei Lin Wong (57) ABSTRACT

A microphone with integrated speaker which includes a front casing with a front connecting portion and a front handle portion having a battery opening; a rear casing with a rear connecting portion and a rear handle portion connected to the front casing to form a first cavity with a cylindrical connecting portion and a cylindrical handle portion with a second cavity; a metallic net cover coupled with the cylindrical connecting portion; a vocal pickup support arrangement provided inside the metallic net cover between the front connecting portion and the rear connecting portion in which a vocal pickup unit is provided; a speaker positioned inside the first cavity; a pair of electrode plates positioned inside the second cavity; a circuit board affixed on the front casing; a battery cover detachably connected to the front handle portion; and an aluminum alloy handle covers the cylindrical handle portion.

10 Claims, 6 Drawing Sheets

MICROPHONE WITH INTEGRATED SOUND BOX

BACKGROUND OF THE PRESENT INVENTION

Field of Invention

The present invention relates to a vocal pickup device, and more particularly to a microphone with integrated sound box.

Description of Related Arts

Conventional microphones usually have a main body which are mostly cylindrical in shape. When a speaker or sound box structure is required, the handle portion and the vocal pickup portion are usually installed at two opposite ends of the sound box. This design usually requires excessive mechanical parts rendering the installation process more complicated and it will increase the manufacturing cost. Also, the battery unit of these microphones are usually built-in. Therefore, during transportation or stage use, the microphone is subject to external forces such as hitting or beating and so the built-in battery is also subject to these forces. When the built-in battery malfunctions due to these forces, the whole microphone has to be discarded due to the built-in battery construction. The user cannot repair and reuse the microphone in time. Especially during transportation, the protective measure of a microphone is lower than that of a battery while the battery has to be installed into the microphone and carried by the microphone for transportation, safety is also a main concern when transporting these microphones in mass units.

SUMMARY OF THE PRESENT INVENTION

In order to solve the above problems, an object of the present invention is to provide a microphone with speaker which is simple in structure, easy to replace battery, capable of increasing utilization rate of the microphone, decreasing safely hazards, hiding a cover of the battery compartment and has a good aesthetic design.

According to the present invention, the foregoing and other objects and advantages are attained by the followings:

A microphone with integrated speaker, comprising: a front casing having a front casing top end and a front casing bottom end opposite to the front casing top end; a front connecting portion provided at the front casing top end; a front handle portion having a battery opening provided at the front casing bottom end; a rear casing having a rear casing top end and a rear casing bottom end opposite to the rear casing top end, the rear casing connected to the front casing to form a first cavity therein; a rear connecting portion provided at the rear casing top end and connected to the front connecting portion to form a cylindrical connecting portion; a rear handle portion provided at the rear casing bottom end and connected to the front handle portion to form a cylindrical handle portion with a second cavity therein; a metallic net cover coupled with the cylindrical connecting portion and affixed into position by screw thread connection; a vocal pickup support arrangement provided inside the metallic net cover and is supported by the front connecting portion and the rear connecting portion between the front connecting portion and the rear connecting portion, wherein the vocal pickup support arrangement comprises a vocal pickup unit; a speaker positioned inside the first cavity; a pair of electrode plates positioned inside the second cavity of the cylindrical handle portion, arranged for connecting to a battery unit for power supply; a circuit board affixed on the front casing and electrically connected to the vocal pickup unit, the speaker and the pair of electrode plates respectively; a battery cover detachably connected to the front handle portion for covering the battery opening in such a manner that the battery unit is fittingly aligned inside the second cavity; and an aluminum alloy handle covering the cylindrical handle portion and affixed into position by screw thread connection.

Preferably, the speaker comprises a diaphragm support positioned at a front end of the speaker and fixedly connected to the front casing; and a diaphragm supported by the diaphragm support, wherein the front casing has a flat panel at a front side of the front casing and a front audio window on the flat panel, wherein the diaphragm is sized to fit and aligned into position with the front audio window, wherein the rear casing has a rear audio window which is sized to fit a rear side of the speaker for securing the speaker into position.

Preferably, the flat panel comprises a plurality of connectors protruding outwardly toward the front side of the front casing and surrounding the front audio window respectively, wherein the circuit board is held into position by the plurality of connectors in such a manner that a gap is form between the circuit board and the flat panel through the plurality of connectors.

Preferably, the flat panel comprises four the connectors.

Preferably, the microphone with integrated speaker further comprises an arc-shaped front panel and an arc-shaped rear panel connected to the front casing respectively, wherein the rear casing is enclosed by the rear panel, wherein the arc-shaped front panel and the arc-shaped rear panel are connected to form a cylindrical shape structure.

Preferably, the arc-shaped rear panel is made of metallic material.

Preferably, an upper snap ring is provided on the cylindrical connecting portion; and an upper decorative ring is affixed on top of the upper snap ring.

Preferably, the upper snap ring has an upper protruded edge extending downwardly from a peripheral of the upper snap ring, wherein a peripheral portion of a top side of the connecting front casing and rear casing after connecting the connecting front casing and the rear casing forms an upper step portion, wherein the upper protruded edge fittingly surrounds the upper step portion, wherein the upper snap ring is affixed onto the front casing and the rear casing by screws.

Preferably, a lower snap ring is provided on the cylindrical handle portion; and a lower decorative ring is affixed to a bottom side of the upper snap ring.

Preferably, the lower snap ring has a lower protruded edge extending upwardly from a peripheral of the lower snap ring, wherein a peripheral portion of a bottom side of the connecting front casing and rear casing after connecting the connecting front casing and the rear casing forms a lower step portion, wherein the lower protruded edge fittingly surrounds the lower step portion, wherein the lower snap ring is affixed onto the front casing and the rear casing by screws.

According to the microphone with integrated sound box of the present invention, a battery compartment is provided inside the second cavity formed by the front handle portion and the rear handle portion while a battery cover is provided to the front handle portion. Therefore, if there is any battery malfunction during use, a user can simply replace the malfunctioned battery instead of trashing the whole microphone unit, thus enhancing the utilization rate of the microphone. Meanwhile, during transportation, the battery and the microphone can be separated for transportation and hence reducing the safety hazards. In addition, the aluminum alloy handle can enclose and cover the battery cover, thus enhancing the aesthetical appearance of the microphone. By connecting the front casing and rear casing, both the assembly of the cylindrical connecting portion and the cylindrical handle portion are completed at the same time, thus simplifying the mechanical structure of the product and increasing the manufacturing productivity.

DETAILED DESCRIPTION OF THE PREFERRED EMBODIMENT

The preferred embodiment of the present invention is further described as follows. One skilled in the art will understand that the embodiment of the present invention as shown in the drawings and described is exemplary only and not intended to be limiting.

According to the preferred embodiment of the present invention, a microphone with integrated sound box is shown in FIG. 1 to FIG. 6 of the drawings. The microphone with integrated sound box refers to a microphone which includes a speaker serving as a sound box for sound output. The terms 'sound box' and 'speaker' are used interchangeably. The microphone with integrated sound box comprises a front casing 1 and a rear casing 2. The front casing 1 has a front casing top end 1031 and a front connecting portion 3 is formed at the front casing top end 1031 of the front casing 1. The rear casing 2 has a rear casing top end 1041 and a rear connecting portion 4 is formed at the rear casing top end 1041 of the rear casing 2. The front casing 1 has a front casing bottom end 1032 opposite to the front casing top end 1031 and comprises a front handle portion 5 at the front casing bottom end 1032 of the front casing 1. The rear casing 2 has a rear casing bottom end 1042 opposite to the rear casing top end 1041 and comprises a rear handle portion 6 at the rear casing bottom end 1042 of the rear casing 2.

The front casing 1 connects to the rear casing 2 to form a first cavity 1010 therein. The front connecting portion 3 connects to the rear connecting portion 4 to forms a cylindrical connecting portion 1030. The front handle portion 5 connects with the rear handle portion 6 and forms a cylindrical handle portion 1040. A metallic net cover 7 is coupled with the cylindrical connecting portion 1030 and secure into position onto the cylindrical connection portion 1030 through a screw thread connection. An vocal pickup support arrangement 70 is provided inside the metallic net cover 7. The vocal pickup support arrangement 70 comprises vocal pickup unit 110. The vocal pickup support arrangement 70 is secure into position between the front connecting portion 3 and the rear connecting portion 4 through the front connecting portion 3 and the rear connecting portion 4. A circuit board 8 is affixed on the front casing 1. A speaker 9 is provided inside the first cavity 1010. The front handle portion 5 and the rear handle portion 6 are connected to form a second cavity 1020 therein. A pair of electrode plates 16 arranged for clamping a battery unit are provided inside the second cavity 1020. The electrode plates 16, the speaker 9, and the vocal pickup unit 110 are electrically connected to the circuit board 8 respectively. The front handle portion 5 comprises a battery opening 13. A battery cover 14 is detachably provided to couple with the front handle portion 5 for covering the battery opening 13. The battery cover 14 aligns with the battery unit. Preferably, the battery cover 14 is made of non-conductive materials. An aluminum alloy handle 15 is provided to cover the cylindrical handle portion 1040 and secures into position through screw thread connection. It is worth mentioning that the aluminum alloy handle 15 can effectively protect the battery cover 14 from falling off when the microphone is dropped by accident.

According to the microphone with integrated sound box of the present invention, a battery holder is formed inside the second cavity 1020 between the front handle portion 5 and the rear handle portion 6 while the front handle portion 5 comprises a battery cover 14, thus if there is a battery malfunction, a user may simply replace the malfunctioned battery instead of replacing the whole microphone unit, thus enhancing the utilization rate of the microphone. Also, during the transportation process of the microphone of the present invention, the battery unit can be separated from the microphone unit, thus reducing the safety hazard for transportation. In addition, the aluminum alloy handle 15 is provided to cover the battery cover 14 and aesthetic appearance of the microphone unit is enhanced. By connecting the front casing 1 and rear casing 2, both the assembly of the cylindrical connecting portion and the cylindrical handle portion are completed at the same time, thus simplifying the mechanical structure of the product and increasing the manufacturing productivity.

Figure 3:
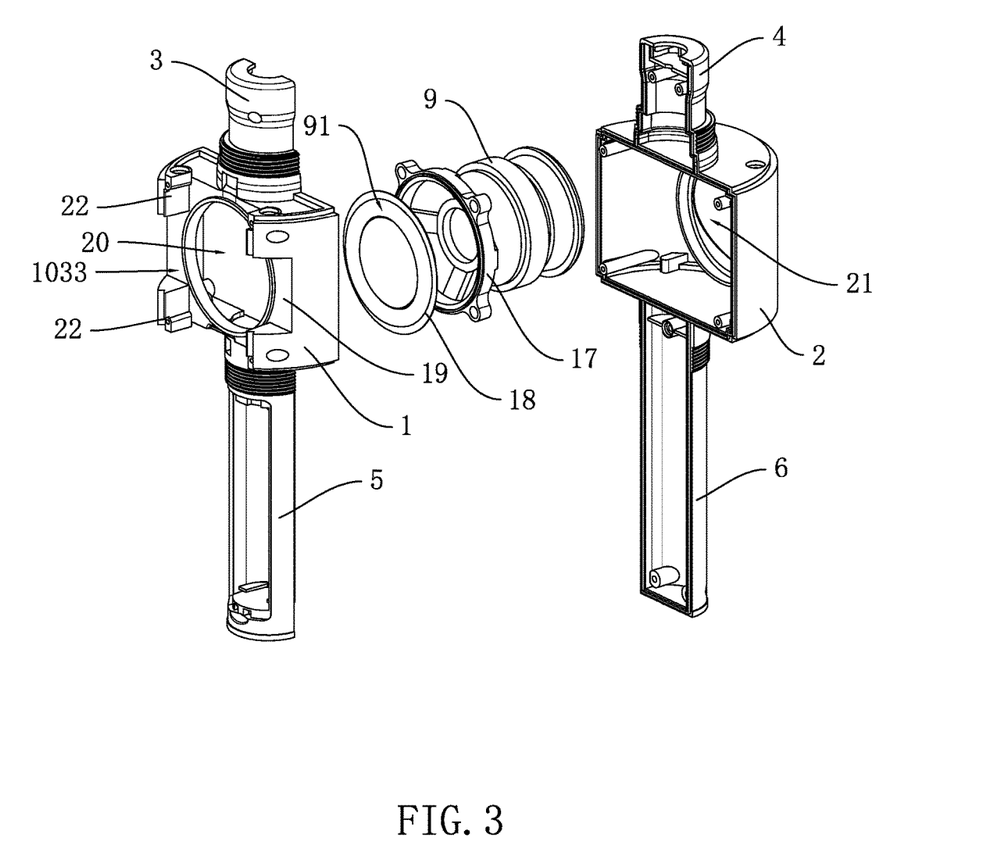
FIG. 3 is another partially exploded view of a microphone with integrated sound box according to the preferred embodiment of the present invention.
Figure 4:
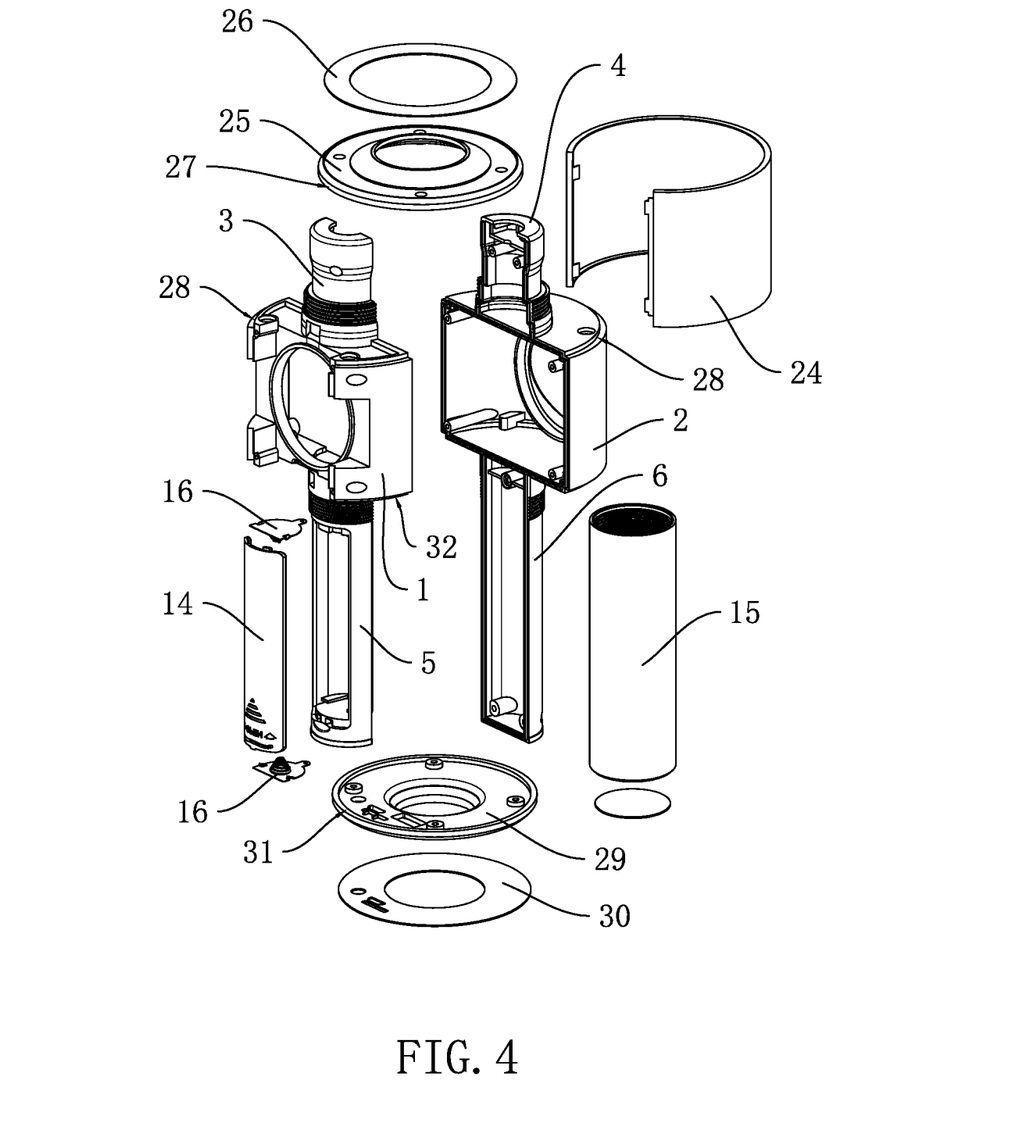
FIG. 4 is another partially exploded view of a microphone with integrated sound box according to the preferred embodiment of the present invention.

Referring to FIG. 3 of the drawings, the speaker 9 has a front end and comprises a diaphragm support 17 at the front end 91 and a diaphragm 18 supported by the diaphragm support 17. The diaphragm support 17 is fixedly connected on the front casing 1. The front side 1033 of the front casing 1 has a flat panel 19. The flat panel 19 has a front audio window 20 therein. The front audio window 20 aligns with the diaphragm 18 fittingly. The rear casing 2 has a rear audio window 21. The rear audio window 21 aligns with the rear side of the speaker 9 fittingly.

Figure 2:
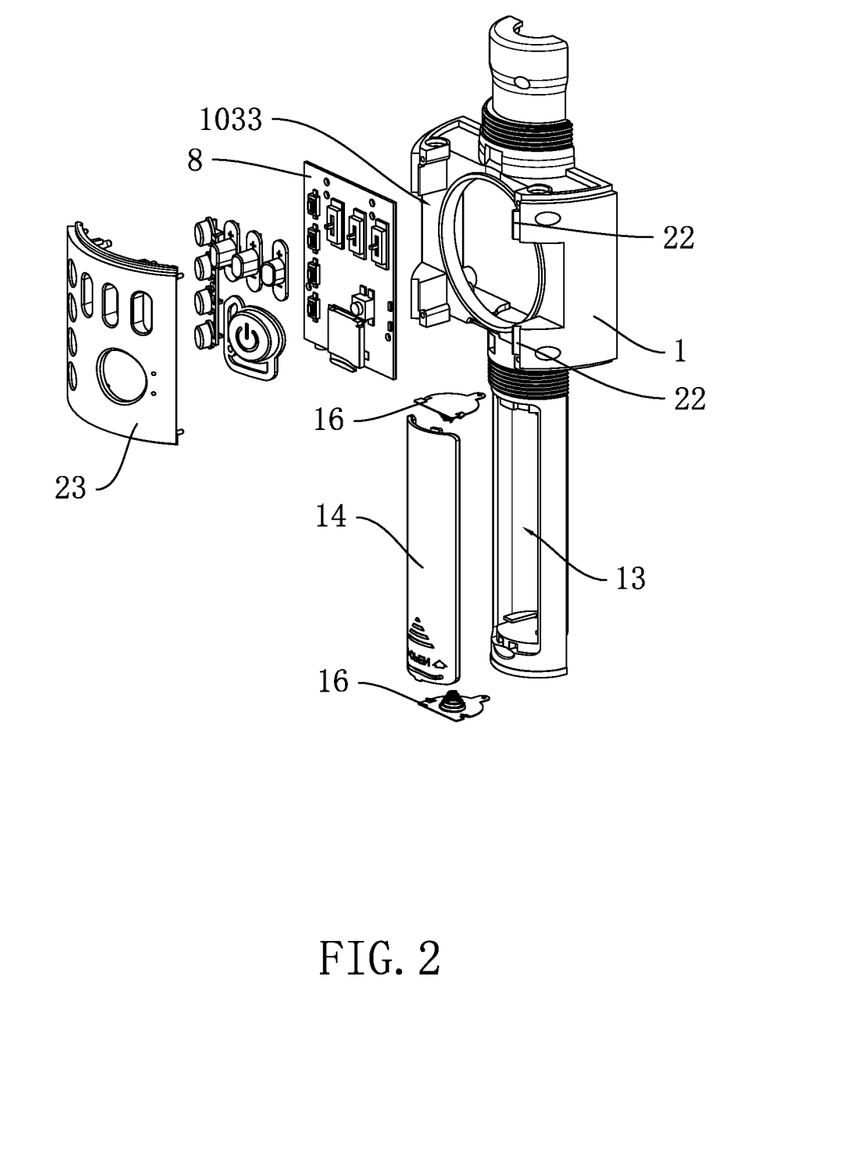
FIG. 2 is another partially exploded view of a microphone with integrated sound box according to the preferred embodiment of the present invention.

According to the preferred embodiment of the present invention, as shown in FIG. 2 and FIG. 3 of the drawings, the flat panel 19 comprises a plurality of connectors 22 protruding outwardly from the flat panel 19. The plurality of connectors 22 are provided around the front audio window 20 respectively such that the circuit board 8 is held in place by the plurality of connectors 22 while a gap is formed between the circuit board 8 and the flat panel 19 by the plurality of connectors 22. This gap can help the sound generated by the speaker to travel outside.

Preferably, the number of connectors 22 is four.

According to the preferred embodiment of the present invention, as shown in FIG. 1 to FIG. 6 of the drawings, the microphone has a cylindrical structure. The front casing 1 is connected to an arc-shaped front panel 23 and an arc-shaped rear panel 24. The arc-shaped front panel 23 and the arc-shaped rear panel 24 are connected together and form a cylindrical shape enclosing both the front casing 1 and the rear casing 2. In particular, the rear casing 2 is positioned inside the rear panel 24. Furthermore, the arc-shaped rear panel 24 is made of metallic material.

Preferably, a plurality of control buttons can be provided for input. The control buttons can be accessed through openings on the front panel 23.

According to the preferred embodiment of the present invention, an upper snap ring 25 is provided on the cylindrical connecting portion 1030. The top of the upper snap ring 25 is connected to an upper decorative ring 26. The upper snap ring 25 has an upper protruded edge 27 extending downwardly from the peripheral of the upper snap ring 25. After front casing 1 and the rear casing 2 are connected to each other, the peripheral portion of the top side of the connecting front casing 1 and rear casing 2 forms an upper step portion 28. The upper protruded edge 27 fittingly surrounds the upper step portion 28. The upper snap ring 25 can be fixed onto the front casing 1 and the rear casing 2 by screws. Under the action of the upper protruded edge 27, the tightness of connection between the front casing 1 and the rear casing 2 can be increased.

According to the preferred embodiment of the present invention, a lower snap ring 29 is provided on the cylindrical handle portion 1040. The bottom side of the lower snap ring 29 is connected to a lower decorative ring 30. The lower snap ring 29 has a lower protruded edge 31 extending upwardly from the peripheral of the lower snap ring 29. After front casing 1 and the rear casing 2 are connected together, the peripheral portion of the bottom side of the connecting front casing 1 and rear casing 2 forms a lower step portion 32. The lower protruded edge 31 fittingly surrounds the lower step portion 32. The lower snap ring 29 can be fixed onto the front casing 1 and the rear casing 2 by screws. Under the action of the lower protruded edge 31, the tightness of connection between the front casing 1 and the rear casing 2 can be increased.

In conventional microphones, the vocal pickup unit is usually installed near the top end of the microphone. In order to avoid sound interference by the microphone structure, a hollow support frame typically made of soft material is used. The support frame usually has one end connecting to the handle of the microphone and another end connecting to the vocal pickup unit and a net cover is utilized to provide protection. However, since the support frame is made of relatively soft material, it lacks steady and solid support. Therefore, when the microphone is being shaken, the vocal pickup unit will swing accordingly and hence noise and echo will be generated easily. In addition, if the amplitude of shaking of the support frame is excessively great, the vocal pickup unit will touch the net cover and generate a relatively great noise.

Figure 5:
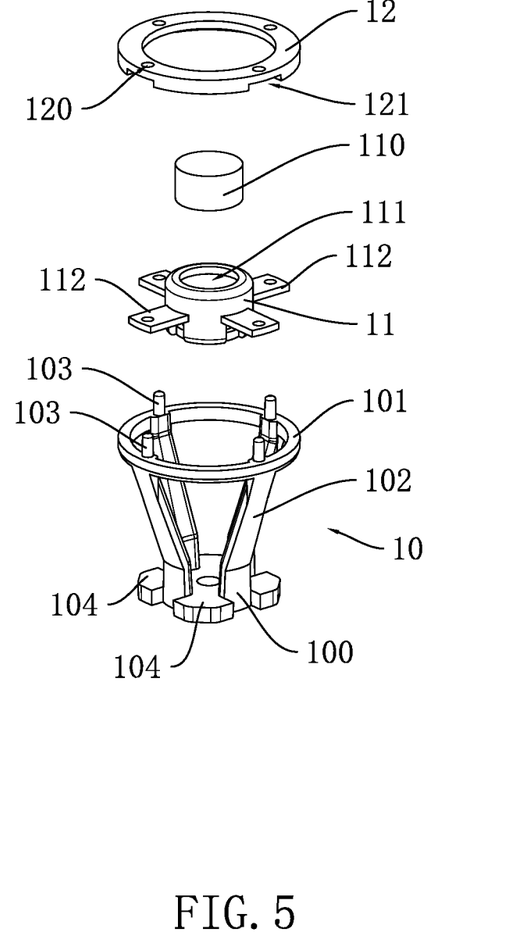
FIG. 5 is an exploded view of a vocal pickup support arrangement of the microphone with integrated sound box according to the preferred embodiment of the present invention.
Figure 6:
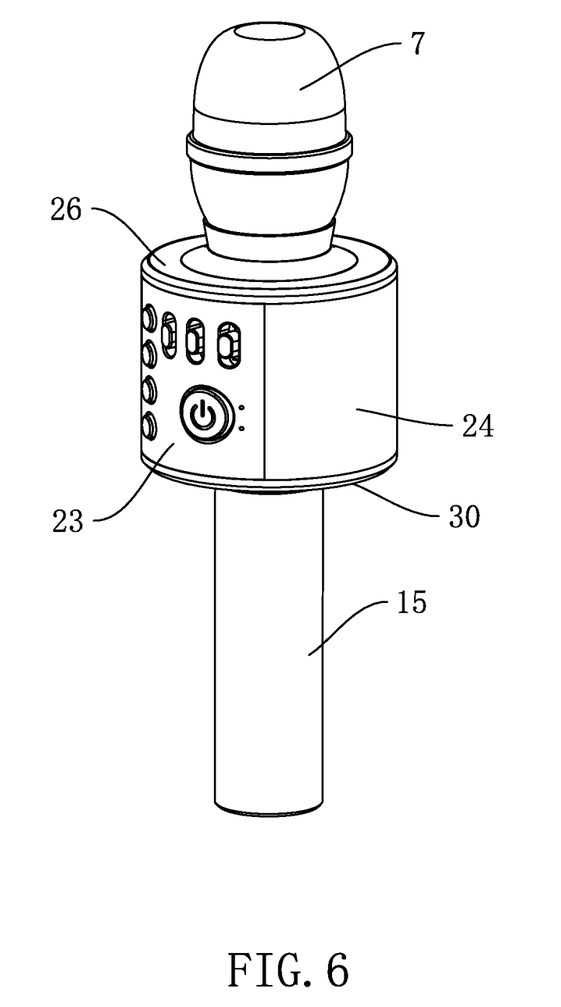
FIG. 6 is a perspective view of a microphone with integrated sound box according to the preferred embodiment of the present invention.

In order to overcome the above problems of conventional microphones, referring to FIG. 5 of the drawings, the vocal pickup support arrangement 70 of the present invention comprises a support frame 10 which is made of rigid material and a pickup stabilizer 11 which is made of soft material. The support frame 10 comprises a support base 100 and a ring-shaped support platform 101 provided on top of the support base 100. The support base 100 and the ring-shaped support platform 101 are connected together by a plurality of columns 102 and a predetermined space is provided between each two columns 102. The pickup stabilizer 11 has a pickup opening 111 for receiving and holding the vocal pickup unit 110. The pickup stabilizer 11 has a side portion and comprises a plurality of extending elements 112 extending radially and outwardly from the side portion. The plurality of extending elements 112 is fixedly connected to the ring-shaped support platform 101.

According to the vocal pickup support arrangement 70 of the present invention as described above, the support base 100 is fixedly mounted on the microphone unit. The support base 100 are the ring-shaped support platform 101 are connected together by the plurality of columns 102. Thus, the support frame 10 has a hollow structure as a whole and is capable of evacuating airflow effectively. Meanwhile, the pickup stabilizer 11 is affixed on the ring-shaped support platform 101 by the plurality of extending elements 112 so that the vocal pickup unit 110 is positioned in the center of the ring-shaped support platform 101. Since the support frame 10 is made of hard or rigid material and the pickup stabilizer 11 is made of soft material, when the microphone unit is being shaken, the combination effect of the support frame 10, the pickup stabilizer 11 and the plurality of extending elements 112 can prevent the vocal pickup unit 110 from generating noise and echo from shaking force and effectively prevent the vocal pickup unit 100 from contact with the net cover. Thus, the vocal pickup quality of the microphone unit is increased dramatically.

According to the preferred embodiment of the present invention, the ring-shaped support platform 101 has a top side from which a plurality of pins 103 are extended upwardly. The plurality of pins 103 and the plurality of extending elements 112 are aligned into position respectively and the pins 103 penetrates through the extending elements 112 respectively. A ring-shaped cover 12 is provided on top of the support frame 10. The ring-shaped cover 12 has a plurality of through holes 120. The plurality of pins 103 also align with the through holes 120 respectively. The pins 103 penetrate through the through holes 120 respectively and the pins 103 and the through holes 120 are fittingly connected to each other.

In order to further stabilize the pickup stabilizer 11, the ring-shaper cover 12 has a bottom portion and a plurality of grooves 121 are provided at the bottom portion. The plurality of grooves 121 are located below the plurality of through holes 120 respectively. The plurality of grooves 121 are arranged to couple with the plurality of extending elements 112 respectively.

Preferably and specifically, the pickup stabilizer 11 has comprises four extending elements 112 at the side portion. The four extending elements 112 is spaced uniformly around the side portion of the pickup stabilizer 11.

According to the present invention, in order to fully utilize the space inside the net cover, the ring-shaped support platform 101 has a diameter greater than a diameter of the support base 100 so that the columns 102 are slanted upwardly and outwardly to form a cone shape.

Preferably and specifically, the number of columns 102 is four.

For ease of manufacturing, the ring-shaped support platform 101, the support base 100 and the columns 102 are molded in a single piece. According to the preferred embodiment of the present invention, the support frame 10 can be made of hard plastic material and the pickup stabilizer 11 can be made of soft plastic material.

Figure 1:
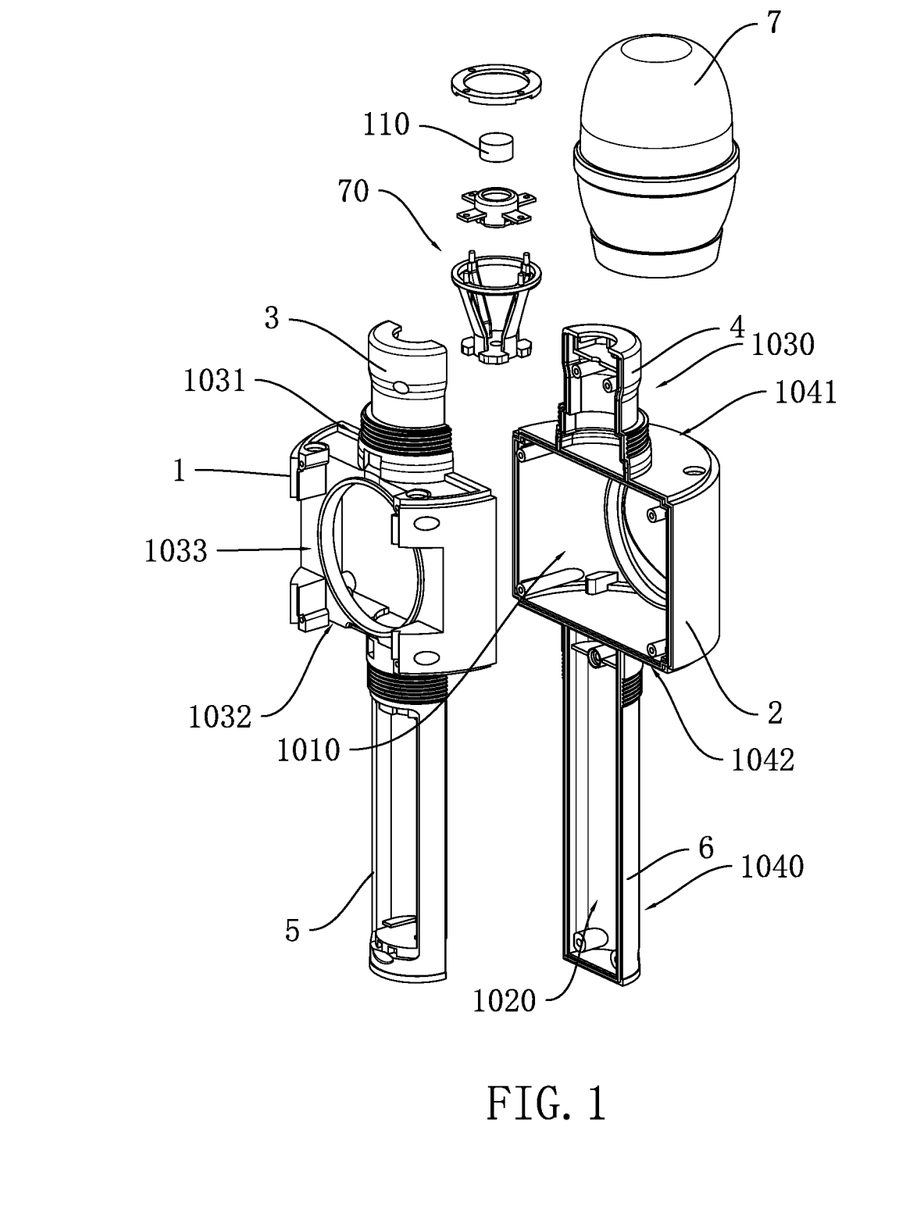
FIG. 1 is a partially exploded view of a microphone with integrated sound box according to the preferred embodiment of the present invention.

According to the preferred embodiment of the present invention, the ring-shaped support platform 101 is a circular ring platform. The support base 100 comprises four protruding pieces 104 protruding from the side of the support base 100. The four protruding pieces 104 are uniformly spaced around the perimeter of the support base 100. The protruding piece 104 has a polygonal bumps construction, which is shown in FIG. 1 and FIG. 5 of the drawings.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A microphone with integrated speaker, comprising:
a front casing having a front casing top end and a front casing bottom end opposite to said front casing top end;
a front connecting portion provided at said front casing top end;
a front handle portion having a battery opening provided at said front casing bottom end;
a rear casing having a rear casing top end and a rear casing bottom end opposite to said rear casing top end, said rear casing connected to said front casing to form a first cavity therein;
a rear connecting portion provided at said rear casing top end and connected to said front connecting portion to form a cylindrical connecting portion;
a rear handle portion provided at said rear casing bottom end and connected to said front handle portion to form a cylindrical handle portion with a second cavity therein;
a metallic net cover coupled with said cylindrical connecting portion and affixed into position by screw thread connection;
a vocal pickup support arrangement provided inside said metallic net cover and is supported by said front connecting portion and said rear connecting portion between said front connecting portion and said rear connecting portion, wherein said vocal pickup support arrangement comprises a vocal pickup unit;
a speaker positioned inside said first cavity;
a pair of electrode plates positioned inside said second cavity of said cylindrical handle portion, arranged for connecting to a battery unit for power supply;
a circuit board affixed on said front casing and electrically connected to said vocal pickup unit, said speaker and said pair of electrode plates respectively;
a battery cover detachably connected to said front handle portion for covering said battery opening in such a manner that the battery unit is fittingly aligned inside said second cavity; and
an aluminum alloy handle covering said cylindrical handle portion and affixed into position by screw thread connection.

2. The microphone with integrated speaker according to claim 1, wherein said speaker comprises a diaphragm support positioned at a front end of said speaker and fixedly connected to said front casing; and a diaphragm supported by said diaphragm support, wherein said front casing has a flat panel at a front side of said front casing and a front audio window on said flat panel, wherein said diaphragm is sized to fit and aligned into position with said front audio window, wherein said rear casing has a rear audio window which is sized to fit a rear side of said speaker for securing said speaker into position.

3. The microphone with integrated speaker according to claim 2, wherein said flat panel comprises a plurality of connectors protruding outwardly toward said front side of said front casing and surrounding said front audio window respectively, wherein said circuit board is held into position by said plurality of connectors in such a manner that a gap is form between said circuit board and said flat panel through said plurality of connectors.

4. The microphone with integrated speaker according to claim 3, wherein said flat panel comprises four said connectors.

5. The microphone with integrated speaker according to claim 3, further comprising an arc-shaped front panel and an arc-shaped rear panel connected to said front casing respectively, wherein said rear casing is enclosed by said rear panel, wherein said arc-shaped front panel and said arc-shaped rear panel are connected to form a cylindrical shape structure.

6. The microphone with integrated speaker according to claim 5, said arc-shaped rear panel is made of metallic material.

7. The microphone with integrated speaker according to claim 1, further comprising an upper snap ring provided on said cylindrical connecting portion; and an upper decorative ring affixed on top of said upper snap ring.

8. The microphone with integrated speaker according to claim 7, wherein said upper snap ring has an upper protruded edge extending downwardly from a peripheral of said upper snap ring, wherein a peripheral portion of a top side of said connecting front casing and rear casing after connecting said connecting front casing and said rear casing forms an upper step portion, wherein said upper protruded edge fittingly surrounds said upper step portion, wherein said upper snap ring is affixed onto said front casing and said rear casing by screws.

9. The microphone with integrated speaker according to claim 7, wherein said lower snap ring has an lower protruded edge extending upwardly from a peripheral of said lower snap ring, wherein a peripheral portion of a bottom side of said connecting front casing and rear casing after connecting said connecting front casing and said rear casing forms a lower step portion, wherein said lower protruded edge fittingly surrounds said lower step portion, wherein said lower snap ring is affixed onto said front casing and said rear casing by screws.

10. The microphone with integrated speaker according to claim 1, further comprising a lower snap ring provided on said cylindrical handle portion; and a lower decorative ring affixed to a bottom side of said upper snap ring.

* * * * *